(12) United States Patent
Youngs

(10) Patent No.: US 11,614,231 B1
(45) Date of Patent: Mar. 28, 2023

(54) PROCESS AND APPARATUS FOR RECOVERING ENERGY FROM LOW ENERGY DENSITY GAS STREAM

(71) Applicant: LanzaTech, Inc., Skokie, IL (US)

(72) Inventor: Darren Earl Youngs, Chicago, IL (US)

(73) Assignee: LanzaTech, Inc., Skokie, IL (US)

( * ) Notice: Subject to any disclaimer, the term of this patent is extended or adjusted under 35 U.S.C. 154(b) by 0 days.

(21) Appl. No.: 17/664,281

(22) Filed: May 20, 2022

(51) Int. Cl.
| F23G 7/06 | (2006.01) |
| F23L 15/00 | (2006.01) |
| F23G 5/12 | (2006.01) |

(52) U.S. Cl.
CPC ............. *F23G 7/068* (2013.01); *F23G 5/12* (2013.01); *F23G 7/06* (2013.01); *F23L 15/00* (2013.01); *F23G 2204/103* (2013.01); *F23G 2206/10* (2013.01); *F23G 2209/14* (2013.01); *F23G 2900/50213* (2013.01); *Y02E 20/30* (2013.01)

(58) Field of Classification Search
CPC ....................................................... F23G 7/068
See application file for complete search history.

(56) References Cited

U.S. PATENT DOCUMENTS

| 5,184,951 A * | 2/1993 | Nutcher | F23D 14/26 432/28 |
| 5,453,259 A * | 9/1995 | D'Souza | F23G 7/068 423/245.3 |
| 5,538,693 A * | 7/1996 | Olivier | F23G 7/068 422/111 |
| 5,770,784 A * | 6/1998 | Heywood | F23G 5/027 588/317 |
| 5,921,763 A * | 7/1999 | Martin | F23G 5/46 431/170 |
| 6,321,462 B1 * | 11/2001 | Seidl | F23G 7/07 34/423 |
| 6,397,766 B1 * | 6/2002 | Oh | F23G 5/006 110/238 |
| 6,832,480 B1 * | 12/2004 | Anguil | F23G 7/068 60/657 |
| 2008/0222913 A1 * | 9/2008 | Ronning | F26B 23/022 34/467 |
| 2009/0221866 A1 | 9/2009 | Stone et al. | |
| 2013/0312424 A1 * | 11/2013 | Juranitch | F23G 5/006 60/780 |
| 2017/0128911 A1 * | 5/2017 | Hong | B01J 20/20 |

FOREIGN PATENT DOCUMENTS

WO 2018175481 A1 9/2018

OTHER PUBLICATIONS

Gasification of MSW (Year: 2017).*

(Continued)

*Primary Examiner* — Nathaniel Herzfeld
(74) *Attorney, Agent, or Firm* — Maryann Maas

(57) ABSTRACT

The disclosure is directed to a process and an apparatus for recovering energy from the low energy density waste gas stream. The process and the apparatus allow a thermal oxidizer to oxidize the low energy density waste gas stream using a low energy density fuel gas such as syngas, BF gas, or biogas without the need for auxiliary high energy density sources.

20 Claims, 1 Drawing Sheet

(56) References Cited

OTHER PUBLICATIONS

"About RTOs (Regenerative Thermal Oxidizers)" RTO Design, Banks Engineering, Inc., pp. 1-9, Published Oct. 8, 2007. Retrieved from URL: http://www.banksengineering.com/About%20RTOs%20Banks%20Engineering%2010-8-2007.pdf.

Foggia et al. "Oxidation Technologies for a Better Environment" Process Combustion Corporation, Presentation prepared for South Texas Section of the American Institute of Chemical Engineering, 35 pages, Aug. 17, 2018. Retrieved from URL: https://www.aiche.org/sites/default/files/community/291721/aiche-community-site-page/315581/thermaloxidizerpresmikefoggia-8.17.18.pdf.

* cited by examiner

PROCESS AND APPARATUS FOR RECOVERING ENERGY FROM LOW ENERGY DENSITY GAS STREAM

FIELD

This disclosure relates to methods and systems for recovering energy from a low energy density gas stream. In particular, the disclosure relates to methods and systems for high-efficiency thermal oxidization of low energy density gases to recover energy.

BACKGROUND

The pursuit of efficient energy supplying solutions at a lower cost for the environment is a challenge set forth by climate action programs all over the world, from the European Commission, the US groups of businesses and environmental and governmental associations, Japan in its attempt to replace nuclear energy for electricity supply in the aftermath of the tragic incident of Fukushima, to the seven emerging economies and, thus, an endeavour globally undertaken by member countries to counteract climate changes and eventually stabilize the temperature of the planet. The ultimate goal is to fulfil the increasing need for sustainable and renewable energy while counteracting climate change towards the transition to a low carbon modern economy.

Carbon dioxide ($CO_2$) accounts for about 76% of global greenhouse gas emissions from human activities, with methane (16%), nitrous oxide (6%), and fluorinated gases (2%) accounting for the balance (the United States Environmental Protection Agency). The majority of $CO_2$ comes from the burning of fossil fuels to produce energy, although industrial and forestry practices also emit $CO_2$ into the atmosphere. Reduction of greenhouse gas emissions, particularly $CO_2$, is critical to halting the progression of global warming and the accompanying shifts in climate and weather.

It has long been recognized that catalytic processes, such as the Fischer-Tropsch process, may be used to convert gases containing carbon dioxide ($CO_2$), carbon monoxide (CO), and/or hydrogen ($H_2$), such as industrial waste gas or syngas, into a variety of fuels and chemicals. Recently, however, gas fermentation has emerged as an alternative platform for the biological fixation of carbon in such gases. In particular, C1-fixing microorganisms have been demonstrated as biocatalysts to convert a substrate and/or C1-carbon source into valuable products such as ethanol or other alcohols.

The substrate and/or C1-carbon source may be a waste gas obtained as a by-product of an industrial process or from another source, such as combustion engine exhaust fumes, biogas, landfill gas, direct air capture, or from electrolysis. The substrate and/or C1-carbon source may be syngas generated by pyrolysis, torrefaction, or gasification. In other words, carbon in waste material may be recycled by pyrolysis, torrefaction, or gasification to generate syngas which is used as the substrate and/or C1-carbon source. The substrate and/or C1-carbon source may be a gas comprising methane, and in certain embodiments, the substrate and/or C1-carbon source may be a non-waste gas.

Typically, an industrial process produces some low energy density waste gas stream comprising dilute concentrations of organic pollutants such as volatile organic compounds (VOCs), volatile hazardous air pollutants (HAPs), or hydrocarbons. To reduce the environmental impact of these industrial waste gas streams, the organic pollutants are converted into less hazardous products by thermal oxidization at high temperatures. However, the caloric value of the waste gas stream is typically too low to support stable combustion in a typical gas-fired burner and/or oil-fired burner(s) that requires a minimum gas energy density of 15-20 $MJ/Nm^3$ for stable combustion. Therefore, the thermal oxidization of these low energy density waste gas streams requires auxiliary heat inputs such as natural gas, or oil to raise the temperature of the waste gas streams to an optimum temperature that allows sufficient oxidation.

Accordingly, there remains a need for a process and an apparatus that reduces or eliminates the need for auxiliary high energy density sources for the efficient thermal oxidization of organic pollutants while simultaneously can recover energy from the low energy density waste gas stream

SUMMARY

The disclosure provides a process and an apparatus for recovering energy from low energy density gas streams. The process comprises: passing a fuel stream having an energy density from about 1.5 to about 15 $MJ/Nm^3$ to a self-recuperative burner or a regenerative burner to burn the fuel stream and heat the thermal oxidizer. At least one waste gas stream having an energy density from about 0.5 to about 5 $MJ/Nm^3$ and a preheated combustion air stream are passed to the thermal oxidizer to oxidize the waste gas stream and produce a hot flue gas. The thermal oxidizer may be heated sufficiently to heat the waste gas stream to at least its auto-ignition temperature or to at least 400° C. above its auto-ignition temperature. The hot flue gas is passed to a steam boiler unit to provide heat and to generate steam. The hot flue gas from the steam boiler unit is passed to an indirect heat exchanger to indirectly heat a combustion air stream to generate the preheated combustion air stream. The combustion air stream may be provided by using a combustion air blower. The combustion air stream may be optionally passed to an enrichment unit before passing to the thermal oxidizer to generate an oxygen-enriched combustion air stream. The enrichment unit is selected from a pressure swing adsorption unit, a membrane separation unit, a cryogenic distillation unit, or any combination thereof. At least a portion of the preheated combustion air stream may be used to heat the fuel stream or the waste gas stream, directly or indirectly, to preheat the fuel stream or the waste gas stream. In certain instances, the steam may be utilized in at least one gas fermentation process unit selected from an electricity generation unit, a product separation unit, a purification unit, a gas treatment unit, an evaporation unit, or a concentration unit, in a clean-in-place method, or any combination thereof.

The thermal oxidizer is selected from a direct fired thermal oxidizer, a recuperative thermal oxidizer, a regenerative thermal oxidizer, a catalytic thermal oxidizer, a flameless thermal oxidizer, or any combination thereof. In an embodiment, when the thermal oxidizer is a direct fired, regenerative, or a recuperative thermal oxidizer, another fuel stream having an energy density in the range of about 1.5 $MJ/Nm^3$ to about 40 $MJ/Nm^3$ may be passed to the self-recuperative burner or a regenerative burner of the direct fired, regenerative, or recuperative thermal oxidizer.

In certain instances, the waste gas stream comprises an organic compound targeted for thermal incineration. The waste gas stream may be obtained from a gas fermentation process and selected from an off-gas stream from a bioreactor, a regeneration gas stream from an adsorption unit, an off-gas stream from a distillation unit, a biogas stream from a wastewater treatment unit, an exit gas stream from purification unit, or any combination thereof. In certain instances, the fuel stream comprises a by-product gas stream obtained from at least one of an industrial process, or a synthesis gas process, or combustion engine exhaust fumes, or direct air capture, or electrolysis. The industrial process may be selected from carbohydrate fermentation, gas fermentation, cement making, pulp and paper making, steel making, oil refining, petrochemical production, coke production, anaerobic digestion, aerobic digestion, natural gas extraction, oil extraction, geological reservoirs, metallurgical processes, refinement of aluminium, copper and or ferroalloys, for production of aluminium, copper, and or ferroalloys, or any combination thereof; or the synthesis gas process is selected from gasification of gasification of coal, gasification of refinery residues, gasification of biomass, gasification of lignocellulosic material, black liquor gasification, gasification of municipal solid waste, gasification of industrial solid waste, gasification of sewerage, gasification of sludge from wastewater treatment, reforming of natural gas, reforming of biogas, reforming of landfill gas or any combination thereof.

In certain instances, the disclosure provides passing a supplemental fuel stream having an energy density from about 1.5 to about 20 MJ/Nm$^3$ to the self-recuperative burner or a regenerative burner of the thermal oxidizer. The supplemental fuel stream is a gas stream produced in an industrial process, a gasification process, a gas fermentation process, or a combination thereof.

The disclosure also provides an apparatus to recover energy from a low energy density gas stream. The apparatus comprises a recuperative burner or a regenerative burner positioned in a thermal oxidizer; a fuel gas conduit in fluid communication with the recuperative burner or regenerative burner of the thermal oxidizer; a waste gas conduit in fluid communication with the thermal oxidizer; a combustion air conduit in fluid communication with the thermal oxidizer and in communication with an indirect heat exchanger; and a flue gas conduit in fluid communication with the thermal oxidizer and in communication with a steam boiler unit and the indirect heat exchanger.

In certain instances, the combustion air conduit is in further fluid communication with a combustion air blower. The combustion air conduit is in fluid communication with the fuel gas conduit or the waste gas conduit. The fuel gas conduit is in further fluid communication with a bioreactor, an extraction unit, a wastewater treatment unit, a gasifier, or any combination thereof. The waste gas conduit is in further fluid communication with at least one gas fermentation process unit selected from a bioreactor, an adsorption unit, a distillation unit, a wastewater treatment unit, a purification unit, or any combination thereof. The thermal oxidizer may be a direct fired thermal oxidizer, a recuperative thermal oxidizer, a regenerative thermal oxidizer, a catalytic thermal oxidizer, a flameless thermal oxidizer, or any combination thereof.

Although the disclosure is broadly as defined above, it is not limited thereto and includes embodiments of which the following description provides examples.

BRIEF DESCRIPTION OF THE DRAWINGS

The Figures have been simplified by the deletion of a large number of apparatuses customarily employed in a process of this nature, such as vessel internals, temperature and pressure controls systems, flow control valves, recycle pumps, and the like. which are not specifically required to illustrate the performance of the invention. Furthermore, the illustration of the process of this invention in the embodiment of a specific drawing is not intended to limit the disclosure to specific embodiments. Some embodiments may be described by reference to the process configuration shown in the figure, which relate to both apparatus and processes to carry out the disclosure. Any reference to a process step includes reference to an apparatus unit or equipment that is suitable to carry out the step, and vice-versa.

DETAILED DESCRIPTION

Figure 1:
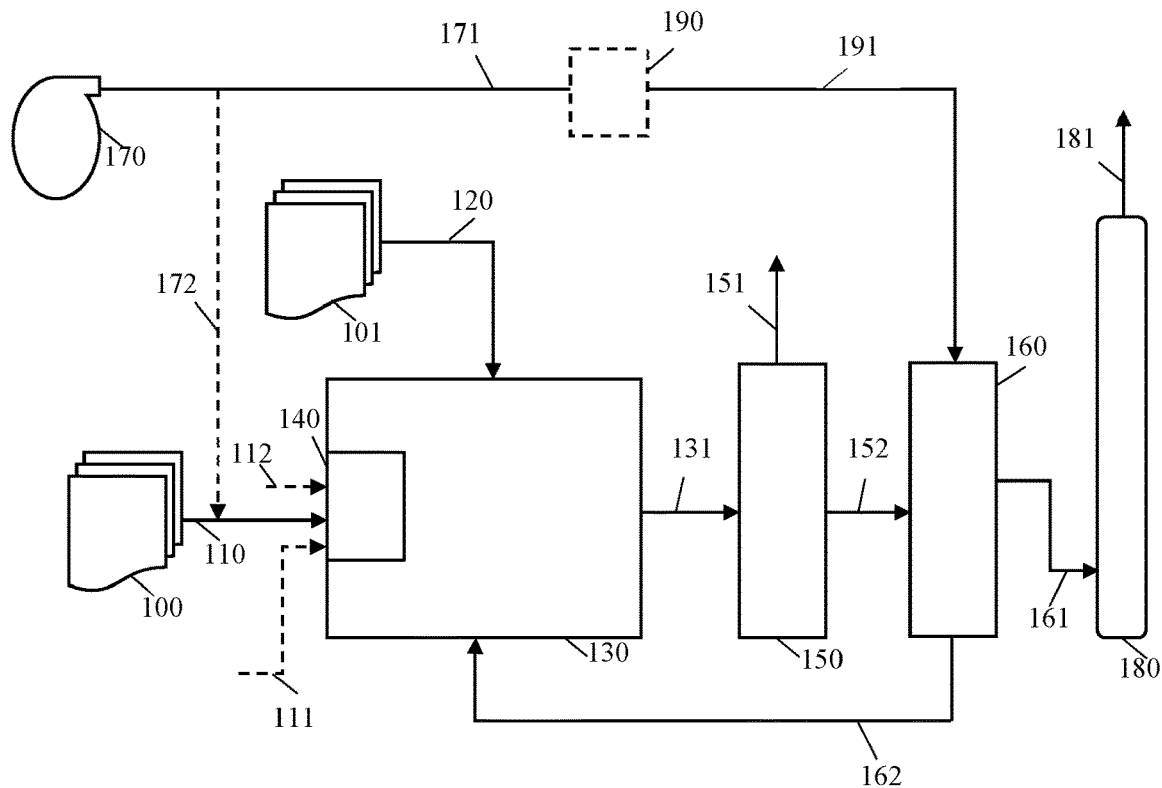
FIG. 1 shows a flow scheme of a process and an apparatus for recovering energy from a low energy density gas stream, in accordance with an exemplary embodiment of the disclosure.

There is an overall need to recover energy from low energy density waste gases and at the same time to reduce dependence on auxiliary heat inputs for stable combustion and oxidation of organic pollutants such as volatile organic compounds (VOCs), volatile hazardous air pollutants (HAPs) or hydrocarbons in the low energy density waste gases. The present disclosure provides a method and a system that helps in efficiently recovering energy from the low energy density waste gas stream.

The low energy density waste gas stream comprises at least one organic compound targeted for thermal incineration. The organic compounds present in the waste gas stream may comprise carbon monoxide, hydrogen, or methane. In an embodiment, the waste gas stream may be obtained from gas fermentation of C1-carbon source and/or substrate. The waste gas stream may include various constituents that are best removed before further processing namely sulphur-containing compounds such as hydrogen sulphide that may be produced, introduced, and/or concentrated by a gas fermentation bioreactor.

The gas fermentation bioreactor includes a culture of one or more C1-fixing microorganisms that have the ability to produce one or more products from a C1-carbon source. "C1" refers to a one-carbon molecule, for example, CO, $CO_2$, $CH_4$, or $CH_3OH$. "C1-carbon source" refers a one carbon-molecule that serves as a partial or sole carbon source for the microorganism of the disclosure. For example, a C1-carbon source may comprise one or more of CO, $CO_2$, $CH_4$, $CH_3OH$, or $CH_2O_2$. In an embodiment, the C1-carbon source comprises one or both of CO and $CO_2$. "Substrate" refers to a carbon and/or energy source for the microorganism of the disclosure. Typically, the substrate is gaseous and comprises a C1-carbon source, for example, CO, $CO_2$, and/or $CH_4$. The substrate may further comprise other non-carbon components, such as $H_2$, $N_2$, or electrons. Although the substrate is typically gaseous, the substrate may also be provided in alternative forms. For example, the substrate may be dissolved in a liquid saturated with a C1-carbon source gas using a microbubble dispersion generator. By way of further example, the substrate may be adsorbed onto a solid support.

The substrate and/or C1-carbon source may be a waste gas obtained as a by-product of an industrial process or from another source, such as combustion engine exhaust fumes, biogas, landfill gas, direct air capture, or from electrolysis. The substrate and/or C1-carbon source may be syngas generated by pyrolysis, torrefaction, or gasification. In other words, carbon in waste material may be recycled by pyrolysis, torrefaction, or gasification to generate syngas which is used as the substrate and/or C1-carbon source. The substrate and/or C1-carbon source may be a gas comprising methane, and in certain embodiments, the substrate and/or C1-carbon source may be a non-waste gas.

In certain embodiments, the industrial process is selected from ferrous metal products manufacturing, such as a steel manufacturing, non-ferrous products manufacturing, petroleum refining, electric power production, carbon black production, paper and pulp manufacturing, ammonia production, methanol production, coke manufacturing, petrochemical production, carbohydrate fermentation, cement making, aerobic digestion, anaerobic digestion, catalytic processes, natural gas extraction, cellulosic fermentation, oil extraction, industrial processing of geological reservoirs, processing fossil resources such as natural gas coal and oil, or any combination thereof. Examples of specific processing steps within an industrial process include catalyst regeneration, fluid catalyst cracking, and catalyst regeneration. Air separation and direct air capture are other suitable industrial processes. Specific examples in steel and ferroalloy manufacturing include blast furnace gas, basic oxygen furnace gas, coke oven gas, direct reduction of iron furnace top gas, and residual gas from smelting iron. Other general examples include flue gas from fired boilers and fired heaters, such as naturel gas, oil, or coal fired boilers or heaters, and gas turbine exhaust. In these embodiments, the substrate and/or C1-carbon source may be captured from the industrial process before it is emitted into the atmosphere, using any known method.

The substrate and/or C1-carbon source may be synthesis gas known as syngas, which may be obtained from reforming, partial oxidation, or gasification processes. Examples of gasification processes include gasification of coal, gasification of refinery residues, gasification of petroleum coke, gasification of biomass, gasification of lignocellulosic material, gasification of waste wood, gasification of black liquor, gasification of municipal solid waste, gasification of municipal liquid waste, gasification of industrial solid waste, gasification of industrial liquid waste, gasification of refuse derived fuel, gasification of sewerage, gasification of sewerage sludge, gasification of sludge from wastewater treatment, gasification of biogas such as when biogas is added to enhance gasification of another material. Examples of reforming processes include, steam methane reforming, steam naphtha reforming, reforming of natural gas, reforming of biogas, reforming of landfill gas, naphtha reforming, and dry methane reforming. Examples of partial oxidation processes include thermal and catalytic partial oxidation processes, catalytic partial oxidation of natural gas, partial oxidation of hydrocarbons. Examples of municipal solid waste include tires, plastics, and fibres such as in shoes, apparel, and textiles. Municipal solid waste may be simply landfill-type waste and may be sorted or unsorted. Examples of biomass may include lignocellulosic material and microbial biomass. Lignocellulosic material may include agriculture waste and forest waste.

The substrate and/or C1-carbon source may be a gas stream comprising methane. Such a methane containing gas may be obtained from fossil methane emissions such as during fracking, wastewater treatment, livestock, agriculture, and municipal solid waste landfills. It is also envisioned that the methane may be burned to produce electricity or heat and the C1 by-products may be used as the substrate or carbon source.

Some embodiments of the disclosure may be described by reference to the process configuration shown in FIGS. 1 and 2, which relate to both apparatus and methods to carry out the disclosure. Any reference to a method step includes reference to an apparatus unit or equipment that is suitable to carry out the step, and vice-versa. The following detailed description is merely exemplary in nature and is not intended to limit the application and uses of the embodiment described. Furthermore, there is no intention to be bound by any theory presented in the preceding background or the following detailed description.

One embodiment of the process and apparatus of the disclosure is described in FIG. 1. However, embodiments of the disclosure and figures are described by way of example, and it should be appreciated that particular steps or stages necessary in one embodiment may not be necessary in another. Conversely, steps or stages included in the description of a particular embodiment can be optionally advantageously used in embodiments where they are not specifically mentioned. For example, the scope includes application to liquid fermentation processes such as sugar-based fermentation processes. Referring to FIG. 1, the waste gas stream may be obtained from at least one gas fermentation process unit 101. The waste gas streams may be a gas stream generated from at least one gas fermentation process units selected from an off-gas stream from a bioreactor, a regeneration gas stream from an adsorption unit, an off-gas stream from a distillation unit, a biogas stream from wastewater treatment unit, an exit gas stream from purification unit, or any combination thereof. The energy density of the waste gas stream may be in the range of about 0.5 to about 5 MJ/Nm$^3$. In an embodiment, the energy density of the waste gas stream may be in the range of about 1 to about 5 MJ/Nm$^3$. In another embodiment, the energy density of the waste gas stream may be in the range of about 1 to about 2 MJ/Nm$^3$.

The process and the system of the present disclosure minimize the requirement of auxiliary heat inputs like natural gas or oil to raise the temperature of the waste gases that allows sufficient oxidation. A fuel stream 100 may be used to support oxidation of the waste gas stream. In an embodiment, the fuel stream 100 may comprise a by-product gas stream obtained from at least one selected from industrial process, a synthesis gas process, a combustion engine exhaust fumes, direct air capture, electrolysis, or any combination thereof. In certain instances, the industrial process is selected from carbohydrate fermentation, gas fermentation, cement making, pulp and paper making, steel making, oil refining, petrochemical production, coke production, anaerobic digestion, aerobic digestion, natural gas extraction, oil extraction, geological reservoirs, metallurgical processes, refinement of aluminium, copper and or ferroalloys, for production of aluminium, copper, and or ferroalloys, or any combination thereof; or the synthesis gas process is selected from gasification of gasification of coal, gasification of refinery residues, gasification of biomass, gasification of lignocellulosic material, black liquor gasification, gasification of municipal solid waste, gasification of industrial solid waste, gasification of sewerage, gasification of sludge from wastewater treatment, reforming of natural gas, reforming of biogas, reforming of landfill gas or any combination thereof. The energy density of the fuel stream may be in the range from about 2 to about 15 MJ/Nm$^3$. In an embodiment, the energy density of the fuel stream may be in the range from about 4 to about 15 MJ/Nm$^3$. In another embodiment, the energy density of the fuel stream may be in the range from about 4 to about 7 MJ/Nm$^3$.

Referring to FIG. 1, the waste gas stream is passed to thermal oxidizer 130 via waste gas conduit 120. The fuel stream 100 is passed to self-recuperative burner or regenerative burner 140 of the thermal oxidizer 130 via fuel gas conduit 110. Thermal oxidizers, or thermal incinerators, are combustion devices that control volatile organic compounds (VOCs), CO, and volatile hazardous air pollutants (HAPs) emissions by combusting them to carbon dioxide ($CO_2$) and water. In an embodiment, the thermal oxidizer 130 is selected from a direct fired thermal oxidizer, a recuperative thermal oxidizer, a regenerative thermal oxidizer, a catalytic thermal oxidizer, a flameless thermal oxidizer, or any combination thereof.

The first type of thermal oxidizer is direct fired thermal oxidizer. The direct fixed oxidizer operates on the principle that the combustion process gas stream is brought into a furnace section of the direct thermal oxidizer, in which the temperature of the process gas stream is raised at or above the autoignition temperature and held in the furnace section at this temperature for a required residence time in order to fully oxidize the VOCs and HAPs in the stream. The second type of thermal oxidizer is regenerative thermal oxidizer (RTO). RTOs use a ceramic bed which may be heated from a previous oxidation cycle to preheat the input gases to partially oxidize them. The preheated gases enter a combustion chamber that may be heated by an external fuel source to reach the target oxidation temperature. This type of oxidizer is specifically designed for oxidizing large process gas streams having low organic compound concentrations, such as low percentages of organic pollutants including VOCs and HAPs in the process gas stream. The third type of thermal oxidizer is a recuperative thermal oxidizer. Recuperative thermal oxidizers have a primary and/or secondary heat exchanger within the system. A primary heat exchanger preheats an incoming combustion air stream by recuperating heat from an exiting clean gas stream. This primary heat recovery raises the temperature of the process gas stream before entering the combustion chamber, resulting in lower fuel requirements for the oxidizer system. A catalytic thermal oxidizer is another category of thermal oxidizer that uses a catalyst to promote oxidation. Catalytic oxidation occurs through a chemical reaction between the organic pollutants and a precious-metal catalyst bed that is internal to the oxidizer system. However, catalytic thermal oxidizers are not readily used in industry due to their high costs. A flameless thermal oxidizer is another category of thermal oxidizer that uses a refractory-lined vessel filled with ceramic media for Flameless oxidation. Flameless oxidation is a thermal treatment that premixes waste gas, ambient air, and auxiliary fuel, if required, prior to passing the gaseous mixture through the preheated inert ceramic media bed.

The thermal oxidizer of the present disclosure comprises at least one self-recuperative burner or a regenerative burner. Self-recuperative burners may include a recuperator integral to the burner that preheats the incoming combustion air. Self-recuperative burners are configured to transfer a portion of the energy contained within the exhaust/flue gasses to the feed gas and/or combustion air. This design arrangement leads to a high air preheat temperature and excellent thermal efficiencies. Regenerative burners are installed in pairs with one acting as an exhaust as the other fires. When exhausting, refractory media recovers and stores heat from the flue gases. While firing, the heat is recovered from the media by preheating the combustion air. Exhaust gases pass through the regenerative burner body and into a refractory media case which contains refractory material. The refractory media may be heated by the exhaust gases, thus recovering, and storing energy from the flue products. When the media bed is fully heated, the regenerative burner currently firing may be turned off and begins to exhaust the flue products. The regenerative burner with the hot media bed begins firing. Combustion air passes through the media bed and is heated by the hot refractory material resulting in high thermal efficiency.

In an embodiment, in case the thermal oxidizer is the direct fired, regenerative, or recuperative thermal oxidizer; another fuel stream 111 may be passed to the self-recuperative burner or a regenerative burner. The energy density of the additional fuel stream may be in the range of about 1.5 $MJ/Nm^3$ to about 56 $MJ/Nm^3$. In another embodiment, the energy density of the additional fuel stream may be in the range of about 1.5 $MJ/Nm^3$ to about 5.0 $MJ/Nm^3$.

In an embodiment, the heating of the thermal oxidizer should be sufficient to heat the waste gas stream to at least its auto ignition temperature. The thermal oxidizer 130 may be heated to reach at least the auto ignition temperature of the waste gas stream to oxidize the waste gas stream and produce a hot flue gas via flue gas conduit 131. In an embodiment, the heating of the thermal oxidizer should be sufficient to heat the waste gas stream above its auto ignition temperature. The thermal oxidizer 130 may be heated to at least 400° C. above the auto ignition temperature of the waste gas stream. The autoignition temperature or kindling point of a substance is the lowest temperature at which it spontaneously ignites in a normal atmosphere without an external source of ignition, such as a flame or spark. This temperature is required to supply the activation energy needed for combustion.

In another embodiment, a supplemental fuel stream, shown as 112 in FIG. 1, may also be passed to the self-recuperative burner or to the regenerative burner of the thermal oxidizer. The energy density of the supplemental fuel stream may be in a range from about 4 to about 20 $MJ/Nm^3$. In another embodiment, the energy density of the supplemental fuel stream may be in a range about 4 to about 15 $MJ/Nm^3$. The supplemental fuels stream may be a gas stream produced in an industrial process, a gasification process, a gas fermentation process, or a combination thereof.

Referring to FIG. 1, the hot flue gas may be passed to steam boiler unit 150 to generate steam 151. In an embodiment, the steam generated may be utilized but not limited to in at least one gas fermentation process unit. The steam may be used for generating electricity in an electricity generation unit. The steam may be utilized in product separation for example in a distillation unit. The steam may also be utilized in purification or in concentration of the product, for example in ethanol dehydration. The steam may also be used in a gas treatment unit or in an evaporation unit. Further, the steam may be used in a clean-in-place method, for example for cleaning the bioreactor.

The hot flue gas from the steam boiler unit 150 may be passed to indirect heat exchanger 160 via flue gas conduit 152. A combustion air stream from combustion air blower 170 is passed to the indirect heat exchanger 160 via combustion air conduit 171. In an embodiment, the combustion air conduit 171 may be optionally in fluid communication with an enrichment unit 190. The combustion air stream may be passed to the enrichment unit 190 before passing it to the indirect heat exchanger 160 to generate an oxygen-enriched combustion air stream 191. The enrichment unit may be selected from a pressure swing adsorption unit, a membrane separation unit, a cryogenic distillation unit, or any combination thereof. The enrichment unit reduces the amount of nitrogen in the combustion air, so less heat is absorbed by the nitrogen in the combustion air, thus reducing the energy required to heat the waste gasses and combustion air to the furnace temperature. These higher waste gas stream temperatures may increase the oxidization rate improving flame stability and the acceptable range of energy content of the fuel gas stream. The oxygen-enriched combustion air stream 191 may be passed to the indirect heat exchanger 160. As used herein, the term "enriched" can mean that the outlet stream has a greater concentration of the indicated component than in the inlet stream to a vessel.

The hot flue gas from the steam boiler unit may indirectly heat the combustion air stream in the indirect heat exchanger 160 to generate the preheated combustion air stream. The preheated combustion air stream is passed to the thermal oxidizer 130 to support the oxidization of the waste gas stream and to produce the hot flue gas. In an embodiment, at least a portion of the preheated combustion air stream may be used to heat, directly or indirectly, the fuel stream to preheat the fuel stream. In another embodiment, at least a portion of the preheated combustion air stream may be used to heat, directly or indirectly, the waste gas stream to preheat the waste gas stream.

In an embodiment, at least a portion 172 of the combustion air stream be blended with the waste gas stream and the blended stream may be passed to the self-recuperative burner or the regenerative burner 140. In another embodiment, unproductive flue gas stream 161 in the indirect heat exchanger 160 may be passed to a stack unit 180 to emanate a clean, cooler, and environment-friendly stack gas stream 181. The process and apparatus of the disclosure allows the thermal oxidizer to oxidize a low energy wate gas stream by using a low energy density fuel gas such as syngas, BF gas, or biogas without the need for an external high energy density stream.

Figure 2:
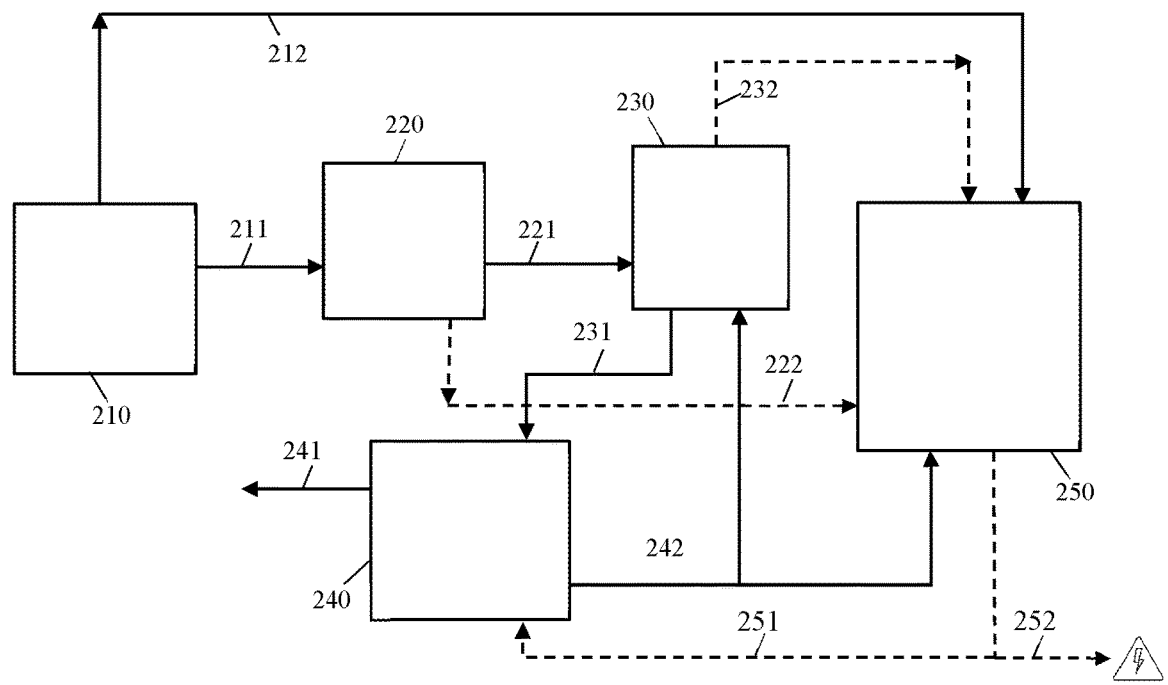
FIG. 2 shows a flow scheme of a gas fermentation process utilizing at least one low energy density waste gas stream, in accordance with an exemplary embodiment of the disclosure.

One embodiment of the process and apparatus of the disclosure is described in FIG. 2 as a gas fermentation process utilizing at least one low energy density waste gas stream via an energy recovery apparatus 250 according to FIG. 1 of the disclosure. However, embodiments of the disclosure and figures are described by way of example, and it should be appreciated that steps or stages necessary in one embodiment may not be necessary in another. Conversely, steps or stages included in the description of a particular embodiment can be optionally advantageously used in embodiments where they are not specifically mentioned.

FIG. 2 shows a schematic flow diagram of a process to utilize energy from at least one low energy density waste gas stream of a gas fermentation process, as one exemplary embodiment of the disclosure. The gas fermentation process may be a platform for the biological fixation of carbon in by product gases comprising carbon dioxide ($CO_2$), carbon monoxide (CO), and/or hydrogen ($H_2$) using C1-fixing microorganisms as biocatalysts to convert substrate and/or C1-carbon source into valuable products such as ethanol or other alcohols.

A "C1-fixing microorganism" is a microorganism that has the ability to produce one or more products from a C1-carbon source. Typically, the microorganism of the disclosure is a C1-fixing bacterium. A "microorganism" or "biocatalyst" is a microscopic organism, especially a bacterium, archea, virus, or fungus. The microorganism of the disclosure is typically a bacterium. As used herein, recitation of "microorganism" should be taken to encompass "bacterium". "Viable microorganisms" or "viability of the microbial biomass" and the like refers to the ratio of microorganisms that are alive, capable of living, developing, or reproducing to those that are not. The disclosure may be designed so that the viability of the microbial biomass is maintained at a minimum viability.

The microorganisms in the bioreactor may be modified from a naturally occurring microorganism. A "parental microorganism" is a microorganism used to generate a microorganism of the disclosure. The parental microorganism may be a naturally occurring microorganism, known as a wild-type microorganism or a microorganism that has been previously modified, known as a mutant or recombinant microorganism. The microorganism of the disclosure may be modified to express or overexpress one or more enzymes that were not expressed or overexpressed in the parental microorganism. Similarly, the microorganism of the disclosure may be modified to contain one or more genes that were not contained by the parental microorganism. The microorganism of the disclosure may also be modified to not express or to express lower amounts of one or more enzymes that were expressed in the parental microorganism. In one embodiment, the parental microorganism is *Clostridium autoethanogenum*, *Clostridium ljungdahlii*, or *Clostridium ragsdalei*. In an embodiment, the parental microorganism is *Clostridium autoethanogenum* LZ1561, which was deposited on Jun. 7, 2010, with Deutsche Sammlung von Mikroorganismen and Zellkulturen GmbH (DSMZ) located at Inhoffenstraße 7B, D-38124 Braunschweig, Germany on Jun. 7, 2010, under the terms of the Budapest Treaty and accorded accession number DSM23693. This strain is described in International Patent Publication No. WO 2012/015317.

The microorganism of the disclosure may be cultured with the substrate and/or C1-carbon source in gas fermentation to produce one or more products. For instance, the microorganism of the disclosure may produce or may be engineered to produce ethanol (WO 2007/117157), acetate (WO 2007/117157), butanol (WO 2008/115080 and WO 2012/053905), butyrate (WO 2008/115080), 2,3-butanediol (WO 2009/151342 and WO 2016/094334), lactate (WO 2011/112103), butene (WO 2012/024522), butadiene (WO 2012/024522), methyl ethyl ketone (2-butanone) (WO 2012/024522 and WO 2013/185123), acetone (WO 2012/115527), isopropanol (WO 2012/115527), lipids (WO 2013/036147), 3-hydroxypropionate (3-HP) (WO 2013/180581), terpenes, including isoprene (WO 2013/180584), fatty acids (WO 2013/191567), 2-butanol (WO 2013/185123), 1,2-propanediol (WO 2014/036152), 1-propanol (WO 2014/0369152), chorismate-derived products (WO 2016/191625), 3-hydroxybutyrate (WO 2017/066498), 1,3-butanediol (WO 2017/066498) 2-hydroxyisobutyrate or 2-hydroxyisobutyric acid (WO 2017/066498), isobutylene (WO 2017/066498), adipic acid (WO 2017/066498), 1,3-hexanediol (WO 2017/066498), 3-methyl-2-butanol (WO 2017/066498), 2-buten-1-ol (WO 2017/066498), isovalerate (WO 2017/066498), isoamyl alcohol (WO 2017/066498), and/or monoethylene glycol (WO 2019/126400) in addition to 2-phenylethanol (WO 2021/188190).

Referring to FIG. 2, a fuel stream generated as a by-product gas stream is obtained from an industrial process 210. At least a portion of fuel stream 212 is passed to the energy recovery apparatus 250. A portion of fuel stream 211 may be passed to an absorption unit 220 to produce a gaseous feed substrate and a first waste gas stream. The gaseous feed substrate 221 may be passed to at least one bioreactor 230 comprising a culture of at least one C1-fixing microorganism. The culture is fermented to produce fermentation broth comprising one or more fermentation product.

Fermentation, including "fermenting", "fermentation process" or "fermentation reaction" and the like, encompasses both the growth phase and product biosynthesis phase of the microorganisms. The fermentation process may be described as either "batch" or "continuous". Batch fermentation is used to describe a fermentation process where the bioreactor is filled with raw material, such as, the carbon source, along with microorganisms, where the products remain in the bioreactor until fermentation is completed. In a batch process, after fermentation is completed, the products are extracted, and the bioreactor is cleaned before the next batch is started. Continuous fermentation is used to describe a fermentation process where the fermentation process is extended for longer periods of time, and product and/or metabolite is removed during fermentation. The disclosure is most advantageous in a continuous fermentation process but is envisioned as applicable to batch fermentation as well.

The fermentation culture is generally maintained in an aqueous culture medium that contains nutrients, vitamins, and/or minerals sufficient to permit growth of the microorganism. In an embodiment the aqueous culture medium is an anaerobic microbial growth medium, such as a minimal anaerobic microbial growth medium. Suitable media are well known in the art. The term "fermentation broth" or "broth" is intended to encompass the mixture of components including the nutrient media, the culture of one or more microorganisms, water and the one or more products. The terms microorganism, bacteria, and biocatalyst are used interchangeably throughout the disclosure.

The fermentation process should be carried out under appropriate conditions for production of the target product. Typically, the fermentation is performed under anaerobic conditions. Reaction conditions to consider include pressure or partial pressure, temperature, gas flow rate, liquid flow rate, media pH, media redox potential, agitation rate if using a continuous stirred tank reactor, inoculum level, maximum gas substrate concentrations to ensure that gas in the liquid phase does not become limiting, and maximum product concentrations to avoid product inhibition. In particular, the rate of introduction of the substrate or components within the substrate may be controlled to ensure that the concentration of gas in the liquid phase does not become limiting, since products may be consumed by the culture under gas-limited conditions.

Operating a bioreactor at elevated pressures allows for an increased rate of gas mass transfer from the gas phase to the liquid phase. Accordingly, one embodiment is to perform the culture/fermentation at pressures higher than atmospheric pressure. Also, since a given gas conversion rate is, in part, a function of the substrate retention time and retention time dictates the required volume of a bioreactor, the use of pressurized systems can greatly reduce the volume of the bioreactor required and, consequently, the capital cost of the culture/fermentation equipment. This, in turn, means that the retention time, defined as the liquid volume in the bioreactor divided by the input gas flow rate, can be reduced when bioreactors are maintained at elevated pressure rather than atmospheric pressure. The optimum reaction conditions will depend partly on the particular microorganism used. In one embodiment the fermentation may be operated at a pressure higher than atmospheric pressure. Also, since a given gas conversion rate is in part a function of substrate retention time and achieving a desired retention time, in turn, influences the required volume of a bioreactor, the use of pressurized systems can greatly reduce the volume of the bioreactor required, and consequently, the capital cost of the fermentation equipment.

The fermentation broth is generated in a bioreactor which includes a fermentation device consisting of one or more vessels and/or towers or piping arrangements. Examples of bioreactors include continuous stirred tank reactor (CSTR), immobilized cell recycles (ICR), trickle bed reactor (TBR), bubble column, gas lift fermenter, static mixer, a circulated loop reactor, a membrane reactor, such as a Hollow Fibre Membrane Bioreactor (HFM BR) or other unit or other device suitable for gas-liquid contact. The reactor may be adapted to receive a gaseous substrate comprising CO and/or $CO_2$, or $H_2$ or mixtures thereof. The reactor may comprise multiple reactors (stages), either in parallel or in series. For example, the reactor may comprise a first growth reactor in which the bacteria are cultured and a second fermentation reactor, to which fermentation broth from the growth reactor may be fed and in which most of the fermentation products may be produced.

The fermentation broth generated from the bioreactor encompasses a mixture of components including the nutrient media, the culture of one or more microorganisms, and the one or more products. "Nutrient media" or "nutrient medium" is used to describe bacterial growth media. Generally, this term refers to a media containing nutrients and other components appropriate for the growth of a microbial culture. The term "nutrient" includes any substance that may be utilised in a metabolic pathway of a microorganism. Exemplary nutrients include potassium, B vitamins, trace metals, and amino acids.

Target fermentation products may be separated the fermentation broth using any method or combination of methods known in the art, including, for example, fractional distillation, evaporation, pervaporation, gas stripping, phase separation, extractive separation, including for example, liquid-liquid extraction. In certain embodiments, target products are recovered from the fermentation broth by continuously removing a portion of the broth from the gas fermentation bioreactor, first separating microbial cells from the broth and then separating the target product from the aqueous remainder. Alcohols and/or acetone may be recovered, for example, by distillation. Acids may be recovered, for example, by adsorption on activated charcoal. Separated microbial biomass may be recycled to the gas fermentation bioreactor. The solution remaining after the target products have been removed may also be recycled to the gas fermentation bioreactor. Additional nutrients may be added to the recycled solution to replenish the medium before it is returned to the gas fermentation bioreactor. Known separation techniques may be employed in the separator. For example, the separator may use vacuum distillation as discussed in WO2018/175481 or the separator may employ a filtration technique such as membrane filtration. In membrane filtration, the membrane retains biocatalyst cells while the permeate passing though the membrane is substantially free of biocatalyst cells.

Referring to FIG. 2, the fermentation broth generated in the bioreactor 230 may be passed to a separator to generate a product substrate comprising one or more fermentation product and a second waste gas stream. The product substrate 231 may be passed to distillation unit 240. At least one fermentation product and a third waste gas stream are separated in the distillation unit 240. At least one fermentation product is collected via conduit 241. One or more of the first waste gas stream 222, second waste gas stream 232 and third waste gas stream 242 are passed to the apparatus 250. At least one of the waste gas streams is oxidized in the apparatus 250 and steam is produced. At least a portion of steam 251 may be passed and utilized in the distillation unit 240. At least a portion of steam 252 may be utilized for generating electricity.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural unless otherwise indicated herein or clearly contradicted by context. The terms "comprising," "having," "including," and "containing" are to be construed as open-ended terms meaning "including, but not limited to" unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language is intended merely to better illuminate the disclosure and does not pose a limitation on the scope of the disclosure unless otherwise claimed. No language in the specification should be construed as indicating any non-claimed element as essential to the practice of the disclosure.

Variations of embodiments disclosed herein may become apparent to those of ordinary skill in the art upon reading the foregoing description. It is expected skilled artisans to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A process to recover energy from a low energy density gas stream comprising:
   a. passing a fuel stream having an energy density from about 1.5 to about 15 MJ/Nm$^3$ to a self-recuperative burner or a regenerative burner of a thermal oxidizer to burn the fuel stream and heat the thermal oxidizer;
   b. passing at least one waste gas stream having an energy density from about 0.5 to about 5 MJ/Nm$^3$ and a preheated combustion air stream to the thermal oxidizer to oxidize the waste gas stream and produce a hot flue gas;
   c. passing the hot flue gas to a steam boiler unit to provide heat and generate steam; and
   d. passing the hot flue gas from the steam boiler unit to an indirect heat exchanger to indirectly heat a combustion air stream and generate the preheated combustion air stream.

2. The process of claim 1 wherein the thermal oxidizer is selected from a direct fired thermal oxidizer, a recuperative thermal oxidizer, a regenerative thermal oxidizer, or any combination thereof.

3. The process of claim 2 wherein the thermal oxidizer is a direct fired, recuperative, or regenerative thermal oxidizer, and the process further comprising passing another fuel stream having an energy density in the range of about 1.5 MJ/Nm$^3$ to about 20 MJ/Nm$^3$ to the self-recuperative burner or the regenerative burner of the direct fired, recuperative, or regenerative thermal oxidizer.

4. The process of claim 1 wherein the waste gas stream comprises an organic compound targeted for thermal incineration.

5. The process of claim 1 wherein the waste gas stream is from a gas fermentation process and selected from an off-gas stream from a bioreactor, a regeneration gas stream from an adsorption unit, an off-gas stream from a distillation unit, a biogas stream from a wastewater treatment unit, an exit gas stream from a purification unit, or any combination thereof.

6. The process of claim 1 wherein the fuel stream comprises a by-product gas stream obtained from at least one selected from an industrial process, a synthesis gas process, combustion engine exhaust fumes, direct air capture, electrolysis, or any combination thereof.

7. The process of claim 6 wherein the industrial process is selected from carbohydrate fermentation, gas fermentation, cement making, pulp and paper making, steel making, oil refining, petrochemical production, coke production, anaerobic digestion, aerobic digestion, natural gas extraction, oil extraction, geological reservoirs, metallurgical processes, refinement of aluminium, copper and or ferroalloys, for production of aluminium, copper, and or ferroalloys, or any combination thereof; or the synthesis gas process is selected from gasification of coal, gasification of refinery residues, gasification of biomass, gasification of lignocellulosic material, black liquor gasification, gasification of municipal solid waste, gasification of industrial solid waste, gasification of sewerage, gasification of sludge from wastewater treatment, reforming of natural gas, reforming of biogas, reforming of landfill gas or any combination thereof.

8. The process of claim 1 further comprising passing a supplemental fuel stream having an energy density from about 1.5 to about 20 MJ/Nm$^3$ to the self-recuperative burner or the regenerative burner of the thermal oxidizer; wherein the supplemental fuel stream is a gas stream produced in an industrial process, a gasification process, a gas fermentation process, or a combination thereof.

9. The process of claim 1 wherein the combustion air stream is provided via a combustion air blower.

10. The process of claim 9 further comprising passing the combustion air stream to an enrichment unit before the passing to the thermal oxidizer; wherein the enrichment unit is selected from a pressure swing adsorption unit, a membrane separation unit, a cryogenic distillation unit, or any combination thereof.

11. The process of claim 1 wherein the heating of the thermal oxidizer is sufficient to heat the waste gas stream to at least its auto ignition temperature.

12. The process of claim 1 wherein the heating of the thermal oxidizer is sufficient to heat the waste gas stream to at least 400° C. above its auto ignition temperature.

13. The process of claim 1 wherein the steam is utilized in an electricity generation unit or in at least one gas fermentation process unit selected from a product separation unit, a purification unit, a gas treatment unit, an evaporation unit, a concentration unit, in a clean-in-place method, or any combination thereof.

14. The process of claim 1 further comprising heating, directly or indirectly, the fuel stream or the waste gas stream with at least a portion of the preheated combustion air stream to preheat the fuel stream or the waste gas stream; or both.

15. An apparatus to recover energy from a low energy density gas stream comprising:
  i. a recuperative burner or a regenerative burner positioned in a thermal oxidizer;
  ii. a fuel gas conduit in fluid communication with both the recuperative burner or regenerative burner of the thermal oxidizer and a low energy density source;
  iii. a waste gas conduit in fluid communication with the thermal oxidizer;
  iv. a combustion air conduit in fluid communication with the thermal oxidizer and in communication with an indirect heat exchanger; and
  v. a flue gas conduit in fluid communication with the thermal oxidizer and in communication with a steam boiler unit and the indirect heat exchanger.

16. The apparatus of claim 15 wherein the combustion air conduit is further in fluid communication with a combustion air blower.

17. The apparatus of claim 16 wherein the combustion air conduit is in fluid communication with the fuel gas conduit or the waste gas conduit.

18. The apparatus of claim 15 wherein the fuel gas conduit is in further fluid communication with a bioreactor, an extraction unit, a wastewater treatment unit, a gasifier, or any combination thereof.

19. The apparatus of claim 15 wherein the waste gas conduit is in further fluid communication with at least one gas fermentation process unit selected from a bioreactor, an adsorption unit, a distillation unit, a wastewater treatment unit, a purification unit, or any combination thereof.

20. The apparatus of claim 15 wherein the thermal oxidizer is a direct fired thermal oxidizer, a recuperative thermal oxidizer, a regenerative thermal oxidizer, or any combination thereof.

\* \* \* \* \*